United States Patent [19]

Komatsu

[11] Patent Number: 4,699,125

[45] Date of Patent: Oct. 13, 1987

[54] ENDOSCOPE APPARATUS

[75] Inventor: Kenichi Komatsu, Tochigi, Japan

[73] Assignee: Kabushiki Kaisha Toshiba, Kawasaki, Japan

[21] Appl. No.: 878,694

[22] Filed: Jun. 26, 1986

[30] Foreign Application Priority Data

Jun. 28, 1985 [JP] Japan ............................ 60-140558

[51] Int. Cl.$^4$ .............................................. A61B 1/04
[52] U.S. Cl. ........................................ 128/6; 358/98
[58] Field of Search ...................... 128/4, 6, 7; 358/98

[56] References Cited

U.S. PATENT DOCUMENTS

| 4,403,605 | 9/1983 | Janikawa | 128/6 |
| 4,487,489 | 12/1984 | Takamatsu | 128/6 X |
| 4,491,865 | 1/1985 | Danna et al. | 358/98 |
| 4,590,923 | 5/1986 | Watanabe | 128/6 |
| 4,625,714 | 12/1986 | Toyota et al. | 128/6 |
| 4,646,724 | 3/1987 | Sato et al. | 128/6 |
| 4,651,202 | 3/1987 | Arakawa | 128/6 X |

FOREIGN PATENT DOCUMENTS

3230942 4/1983 Fed. Rep. of Germany .

Primary Examiner—William H. Grieb
Attorney, Agent, or Firm—Finnegan, Henderson, Farabow, Garrett & Dunner

[57] ABSTRACT

An endoscope apparatus for producing a video signal by inserting an insertion portion in a body cavity of a patient and photographing a portion to be examined and for producing image information for medical diagnosis according to the video signal includes an adding memory, a position error detector, controllers, and a display. The memory sequentially adds and superposes succeeding image information signals constituting the video signal. The detector sequentially compares the adjacent image information signals on a time basis, and detects the position error information between the image information signals of at least portions of identical image area. The controllers cause the memory to start sequential additions in response to an external freeze instruction, and inhibit the sequential additions in response to a detection signal from the detector. The image information signals stored in the memory are displayed on the display.

15 Claims, 9 Drawing Figures

ENDOSCOPE APPARATUS

BACKGROUND OF THE INVENTION

The present invention relates to an endoscope apparatus for observing a body cavity of a patient.

An insertion section of an endoscope is inserted in a body cavity of a patient to observe a portion to be examined.

In a conventional endoscope apparatus, the insertion section is constituted by a bundle of optical fibers. Such an insertion section is inserted in the body cavity to observe an image of the portion to be examined. At the same time, the image is photographed by, for example, a color video camera. The image is thus converted to a color video signal and the video signal is monitored or recorded. In addition, the color video signal can be converted to a digital video signal which can be stored in a memory. In this case, the image can be frozen at any time and a still image is displayed. This frozen or still image can then be photographed by a still camera.

Color solid-state image-pickup devices using a CCD (charge-coupled device), a MOS (metal oxide semiconductor) image sensor, an SIT (static induction transistor), or the like have been developed and used in recent years. This development work has resulted in the introduction of an endoscope apparatus having such a color solid-state image-pickup device mounted at the distal end of the insertion section. A video signal obtained by the solid-state image pickup device is sent through a conductive cable. In this apparatus, the insertion section mainly comprises the conductive cable, the solid-state image-pickup device, and a light guide consisting of the bundle of optical fibers for guiding light from a light source, to illuminate the body cavity. The video signal obtained by the solid-state image-pickup device is used for display and/or recording. In addition, the video signal can be converted to a digital signal which can be stored in a memory, so that the frozen image of the video signal can be displayed and can be photographed.

In a conventional endoscope apparatus of this type, a frozen image corresponds to a frame in a color video signal having a plurality of continuous frames. Therefore, the image information produced as a still image has a low S/N ratio. This low S/N ratio occurs for the following reasons: First, a noise component in a still image is more noticeable than that in a moving image. Second, since the color video signal has a wide frequency band, noise tends to be mixed therewith, and the video signal is then influenced by the noise component. Third, since the portion to be examined is observed through a pinhole aperture, so as to obtain a large depth of field, the amount of light reaching the detection surface, as the photographing portion of the video camera, is small, and the level of the resultant video signal is low.

The frozen image, therefore, has a low S/N ratio and cannot be easily exposed on a film, as a clear image. At present, as a matter of fact, the photographed film is observed by a plurality of doctors at different times and some doctors may miss important diagnostic data because of the poor quality of the image.

SUMMARY OF THE INVENTION

It is an object of the present invention to provide an endoscope apparatus for producing a clear frozen image which is substantially free from poor quality image portions that could lead to misdiagnosis.

In order to achieve the above object of the present invention, there is provided an endoscope apparatus wherein, in order to freeze an image, image information signals of a plurality of succeeding images (frames or fields) in the video signal are added to and superposed on each other, and shifting of the video signals between the images is discriminated to detect motion of a photographed portion, the addition of the video signals is immediately stopped upon detection of motion of the photographed portion, thereby obtaining a frozen image of a plurality of succeeding image information signals obtained by adding and superposing said information signals, and hence obtaining a clear frozen image substantially free from poor quality image portions which could lead to misdiagnosis.

According to the endoscope apparatus of the present invention, sequential comparison of adjacent images of the plurality of succeeding image information signals in the video signal allows detection of motion of the image, and information signals for the still image are added and superposed to obtain a frozen image. Therefore, the resultant frozen image is free from noise, blurring, and artifact. Therefore, accurate diagnosis can be achieved using such a frozen image.

BRIEF DESCRIPTION OF THE DRAWINGS

FIGS. 4A to 4C are graphs for explaining position error detection in the apparatus of FIG. 1, in which

DETAILED DESCRIPTION OF THE PREFERRED EMBODIMENTS

Figure 1:
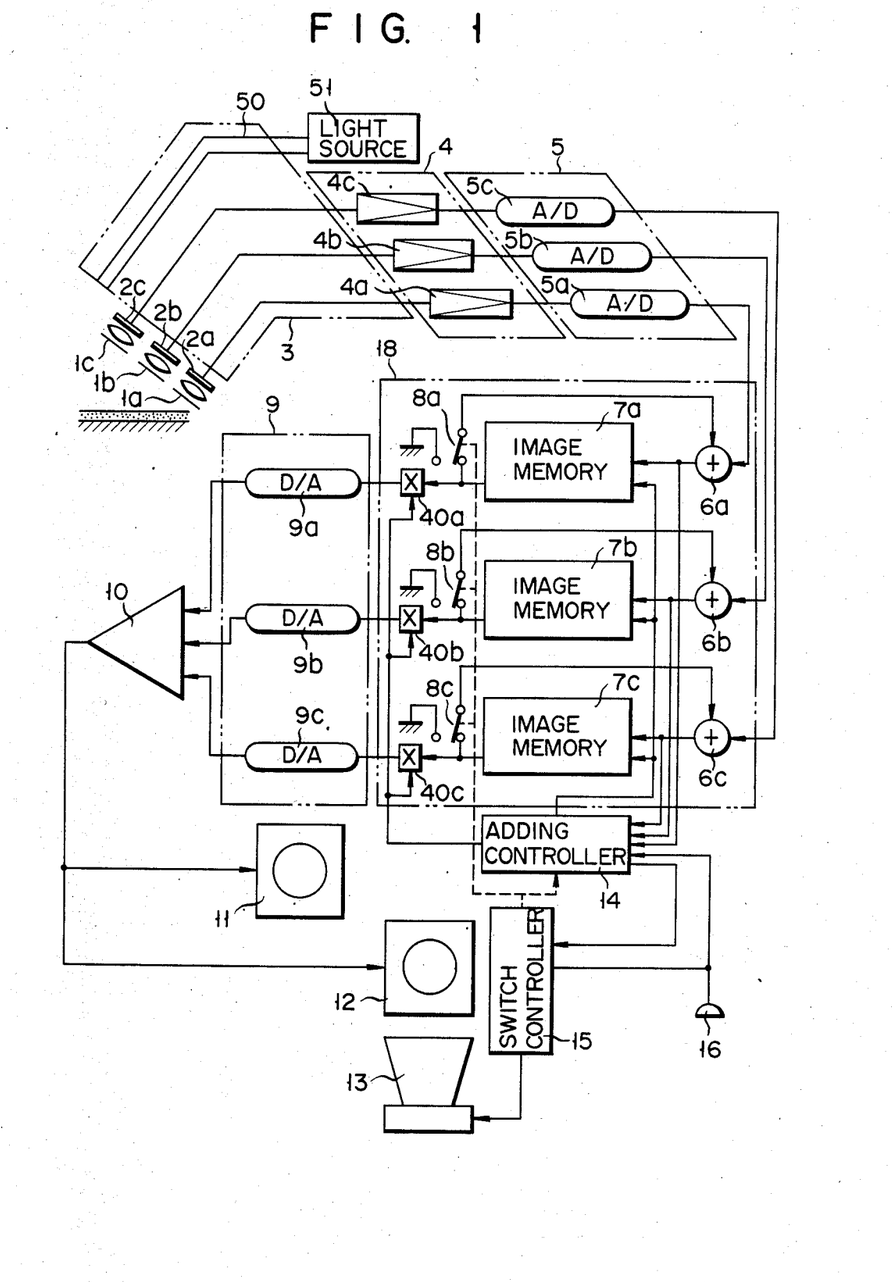
FIG. 1 is a block diagram of an endoscope apparatus according to a first embodiment of the present invention.

As shown in FIG. 1, an endoscope apparatus according to a first embodiment of the present invention comprises red filter 1a, green filter 1b, blue filter 1c, solid-state image sensors 2a, 2b, and 2c, insertion section 3, amplifier section 4, A/D (analog-to-digital) converter section 5, D/A (digital-to-analog) converter section 9, color signal mixer 10, monitor display 11, photographing display 12, still camera 13, adding controller 14, switch controller 15, freeze switch 16, adding memory 18, and light source 51.

Insertion section 3 includes a three-color filter of red, green, and blue filters 1a, 1b, and 1c, and image sensors 2a, 2b, and 2c, such as CCDs, (charge-coupled devices) for converting optical signals to electrical signals. The three-color filters and the image sensors are arranged at the distal end of insertion section 3. Cables are arranged inside insertion section 3 to send video signals from image sensors 2a, 2b, and 2c along different channels. Light guide 50 is also arranged inside insertion section 3 from the proximal end to the distal end thereof to guide light from light source 51 to the distal end of insertion section 3. Insertion section 3 is elongated and flexible, so that it can be easily inserted in a body cavity of a patient.

Amplifier section 4 comprises video amplifiers 4a to 4c for amplifying color video signals from image sensors 2a, 2b, and 2c in insertion section 3.

A/D converter section 5 comprises A/D converters 5a to 5d for converting output signals from video amplifiers 4a to 4c to digital signals.

Adding memory 18 comprises adders 6a to 6c, image memories 7a to 7c, switches 8a to 8c, and multipliers 40a to 40c. The digital signals from A/D converters 5a to 5c are respectively stored in memories 7a to 7c through adders 6a to 6c. Switches 8a to 8c select outputs of image memories 7a to 7c or the ground, and connect the outputs or the ground to adders 6a to 6c. If switches 8a to 8c are connected to the ground, data of "zero" is supplied to adders 6a to 6c. However, if switches 8a to 8c are connected to memories 7a to 7c, the corresponding storage contents are supplied from memories 7a to 7c to adders 6a to 6c, respectively. Adders 6a to 6c add the data selected by switches 8a to 8c to the data supplied from A/D converters 5a to 5c. The sum data is then stored in image memories 7a to 7c. Multipliers 40a to 40c multiply the data read out from image memories 7a to 7c, with coefficient 1/n corresponding to the number of additions n from adding controller 14. D/A converter section 9 comprises D/A converters 9a to 9c for converting the video signals from memories 7a to 7c to analog signals. Color signal mixer 10 receives and mixes the analog signals from converters 9a to 9c, and generates a color composite signal for each image (e.g., one frame). Monitor and photographing displays 11 and 12 display a color image of the patient according to the color composite signal from mixer 10. The photographing timings of still camera 13 are controlled by switch controller 15 and still camera 13 photographs the color image displayed on photographing display 12. Freeze switch 16 inputs an image-freeze instruction signal to the endoscope apparatus. Adding controller 14 fetches the digital signals from adders 6a to 6c, the freeze instruction signal, and a switch control signal from switch controller 15 (to be described later), and controls write access of memories 7a to 7c in response to these signals. Controller 14 sends an addition end signal to switch controller 15. Coefficient 1/n corresponding to the number of additions n is supplied from adding controller 14 to multipliers 40a to 40c. Switch controller 15 supplies control signals to adding controller 14, switches 8a to 8c, and still camera 13, in response to the "addition end" signal from the adding controller 14. Still camera 13 photographs the display image for display 12 in response to this control signal.

Figure 2:
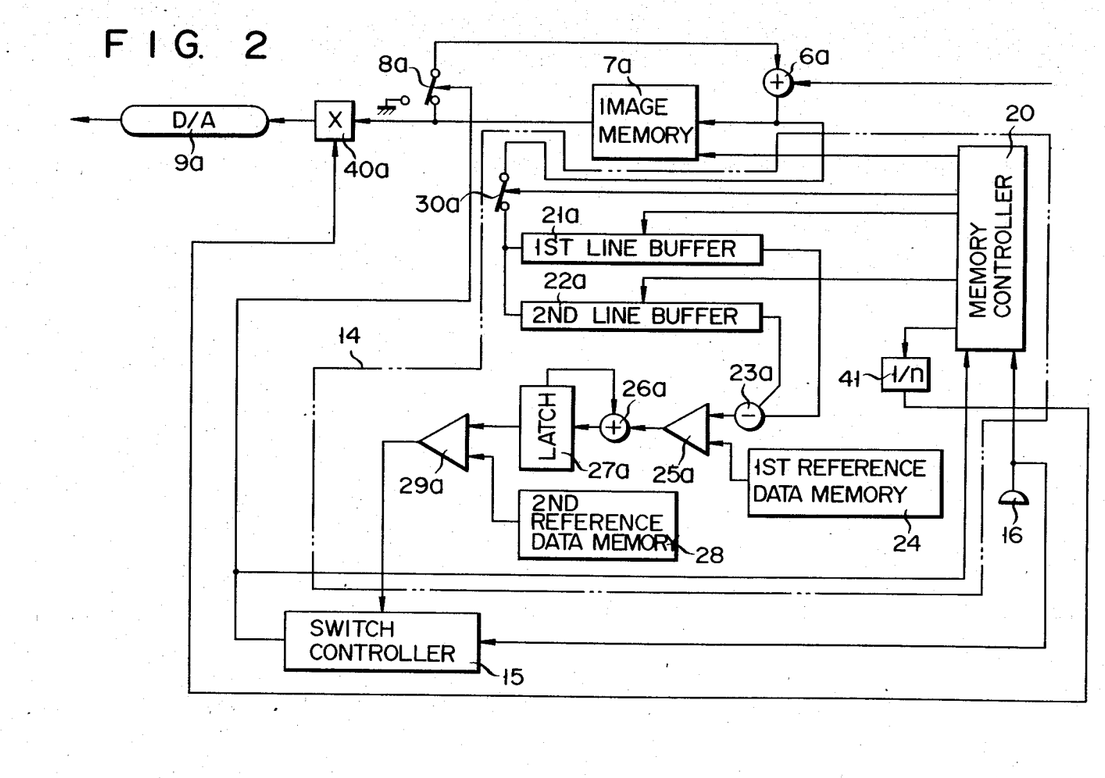
FIG. 2 is a block diagram of an adding controller in the apparatus of FIG. 1.

The arrangement of adding controller 14 will now be described in detail with reference to FIG. 2. For the sake of descriptive simplicity, only one system of the three color signal systems is illustrated in FIG. 2. Portions with suffix a in FIG. 2 are individual components in the three color systems, but portions without suffix a are common components therein.

Adding controller 14 includes memory controller 20. Controller 20 receives the freeze instruction signal from freeze switch 16 and the control signal from switch controller 15, and sends two different write control signals (to be described later) to respective components in image memory 7a and adding controller 14, as well as sending a control signal to operation start switch 30 in adding controller 14. Memory controller 20 counts the number of additions n of the image information signals and sends count n to 1/n operation unit 41. Unit 41 calculates 1/n from count n, and supplies coefficient 1/n to multiplier 40a. First line buffer 21a is controlled by a predetermined write control signal from memory controller 20 and stores a digital signal supplied from A/D converter 5a through adder 6a and switch 30a. Second line buffer 22a is controlled by a predetermined write control signal from memory controller 20, and stores a digital signal supplied from A/D converter 5a through adder 6a and switch 30a. Subtracter 23a calculates the difference between the storage contents of line buffers 21a and 22a, and outputs an absolute value of the difference. First reference data memory 24 stores a reference value near 0. First comparator 25a compares the output from subtracter 23a with the reference value from memory 24, and outputs a value corresponding to the difference therebetween. If the output from subtracter 23a is smaller than the reference value from memory 24, comparator 25a outputs a value of "0". Latch 27a receives the output from first comparator 25a through adder 26a, and temporarily latches it. The latched value is fed back to adder 26a. Second reference data memory 28 stores a preset allowable value, i.e., a second reference value. Second comparator 29a compares the data latched by latch 27a with the reference value from second reference data memory 28. If the value from latch 27a exceeds the reference value from memory 28, comparator 29a supplies the "addition end" signal to switch controller 15.

Figure 3:
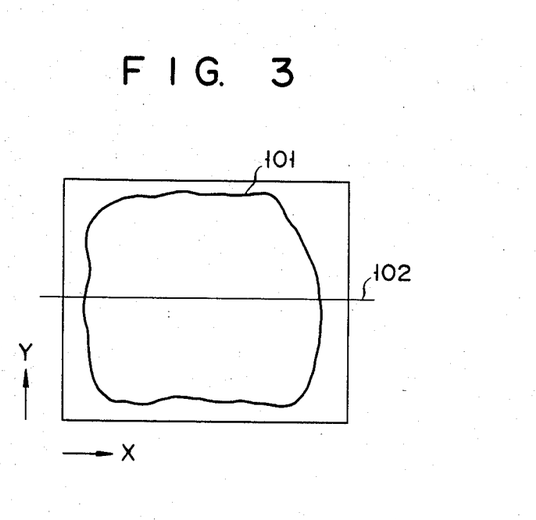
FIG. 3 is a view illustrating an image displayed on a photographing display so as to explain a position error detection area in the apparatus of FIG. 1.

Memory controller 20 prestores address signals corresponding to one-line portion 102 as the central portion of image 101 displayed on monitor or photographing display 11 or 12, as shown in FIG. 3. If the memory address of memory 7a is updated to that corresponding to central portion 102, independent write control signals are supplied to first and second line buffers 21a and 22a, respectively.

In this case, image memories 7b and 7c are controlled by adding controller 14, in the same manner as image memory 7a of FIG. 2.

The operation of the endoscope apparatus having the above arrangement will be described below. For illustrative convenience, the description is confined to digital signal processing associated with image memory 7a. Signal processing for other image memories 7b and 7c will be described only if needed, since it is the same as that for image memory 7a.

Insertion section 3 is inserted in a body cavity of the patient. An image of the portion to be examined, illuminated by light guided from light source 51, through light guide 50, is detected by solid-state image sensors 2a to 2c as optical signals passing through filters 1a to 1c. The optical signals are converted to electrical signals. These electrical signals, i.e., the color signals, are respectively amplified by video amplifiers 4a to 4c. The amplified signals are converted to digital signals by A/D converters 5a to 5c, respectively.

Take the digital signal from A/D converter 5a as an example. This digital signal is supplied to adder 6a. If the freeze mode is not set, switch 8a controlled by switch controller 15 is grounded. In this case, switch 8a sends the "0" data to adder 6a. The digital signal is then controlled by the write control signal from memory controller 20 and is stored in image memory 7a. In response to write access, the storage content of image memory 7a is read out and supplied to D/A converter 9a through multiplier 40a.

The digital signals from other A/D converters 5b and 5c are respectively written in image memories 7b and 7c, are read out therefrom, and supplied to D/A converters 9b and 9c through multipliers 40b and 40c, in the same manner as the digital signal from A/D converter 5a.

The digital signals read out from image memories 7a to 7c through multipliers 40a to 40c (in this case, addition is not performed, so that the number of additions n is 1 and coeffcient 1/n is 1 accordingly) are converted to analog video signals of different colors by D/A converters 9a to 9c. These analog video signals are mixed by color signal mixer 10, and the color composite video signal is supplied to and displayed at displays 11 and 12.

If an operator finds a portion to be photographed while observing the image on monitor display 11, he depresses freeze switch 16 to supply the freeze instruction signal (photographing instruction signal) to switch controller 15 and adding controller 14.

Switch controller 15 sends the control signal to switches 8a to 8c, in response to the freeze instruction signal, to set switches 8a to 8c to their image memories 7a to 7c sides (i.e., the state wherein the outputs from image memories 7a to 7c can be sent to adders 6a to 6c, respectively). At the same time, the control signal is also supplied to memory controller 20. Memory controller 20 sends a control signal to operation start switch 30a, in response to the freeze signal and the switch control signal. As a result, switch 30a is turned on.

The digital signal from A/D converter 5a is added by adder 6a to the digital signal supplied from image memory 7a through switch 8a. The sum signal is written in image memory 7a, to update the storage content. The output from adder 6a is also supplied to first and second line buffers 21a and 22a through switch 30a.

Figure 4A:
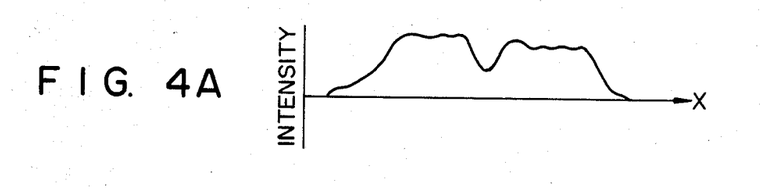
FIG. 4A shows a video signal corresponding to a one-line image, FIG. 4B explains the one-line video signal obtained from a moving object and having the same address as that of the still object.

If the write control signal for image memory 7a coincides with the predetermined address of memory 7a, i.e., the address corresponding to the one-line central portion of the image of FIG. 3 displayed on display 11 or 12, memory controller 20 sends the write control signal to first line buffer 21a, in accordance with the preregistered address signal. The data (line data) corresponding to one line of the central portion of the image (first-page image), immediately after generation of the freeze instruction from adder 6a, is stored in line buffer 21a. The state of line data stored in buffer 21a is represented by the solid line in FIG. 4A.

When the digital signal corresponding to the second image, after generation of the freeze instruction, is supplied, it is added to the first image from image memory 7a, and the memory content of memory 7a is updated. First and second line buffers 21a and 22a are then operated as described above.

Figure 4B:
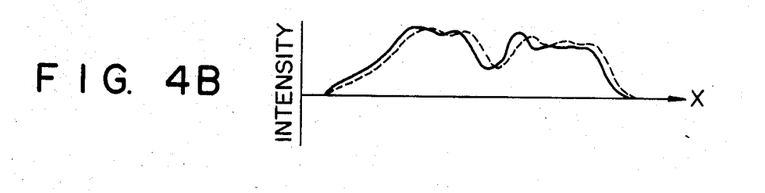

In this case, memory controller 20 supplies the write control signal to second line buffer 22a, in the same manner as the digital signal of the first image. For this reason, data of one line corresponding to the central portion of the image in the digital signal after addition, is stored in second line buffer 22a. The difference between the line data signals stored in first and second line buffers 21a and 22a is then calculated by subtracter 23a. In this case, if no position error between the first and second images is present, as indicated by the solid lines in FIGS. 4A and 4B, the output from subtracter 23a is substantially "0" (including low noise). This value is compared by first comparator 25 with the value near "0" stored in first reference data memory 24. In this case, since the absolute value of the output data from subtracter 23 does not exceed the output value from memory 24, the output from first comparator 25 becomes "0". This value is then latched by latch 27 through adder 26.

Figure 4C:
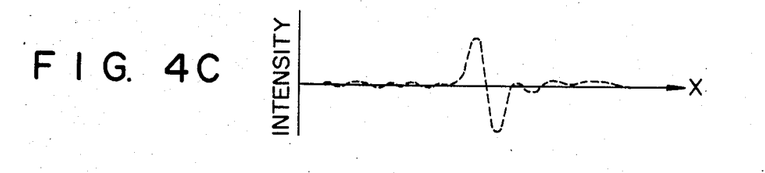
FIG. 4C shows the difference between the video signals in FIGS. 4B.

Additions of the third image, the fourth image, ... are sequentially performed to update image memory 7a and one-line data of second line buffer 22a for each addition. If the Nth image deviates positionally from the first image, as indicated by the broken line in FIG. 4B, the difference therebetween is sufficiently larger than "0", as indicated by the broken line in FIG. 4C. The absolute value of this difference is supplied from subtracter 23a to first comparator 25a. Comparator 25a then outputs a value corresponding to the output from subtracter 23a. This value is added by adder 26a to the output value from latch 27a. The sum is latched by latch 27a again, thus achieving accumulation.

If the output value of latch 27a exceeds the allowable value prestored in second reference data memory 28, the "addition end" signal is supplied from second comparator 29a to switch controller 15. As a result, the control signal is supplied from switch controller 15 to switch 8a and memory controller 20. The series of operations of adding controller 14 is also performed for the digital signals from A/D converters 5b and 5c, in addition to the digital signal from A/D converter 5a.

Switches 8a to 8c are set to the ground side in response to the control signal from switch controller 15. At the same time, memory controller 20 disables operation start switch 30a and operation start switches 30b and 30c connected to adders 6b and 6c (not shown).

Adders 6a to 6c stop adding the data and are held in the frozen state. In this case, the digital signals stored in image memories 7a to 7c and free from position errors, are supplied to color signal mixer 10 through D/A converters 9a to 9c. The digital signals are thus converted to a composite video signal which is supplied to and displayed on displays 11 and 12. At the same time, still camera 13 is operated in response to the photographing control signal synchronized with the image display timing supplied from switch controller 15. An image on photographing display 12 is then photographed by camera 13.

Upon completion of still photography, adding controller 14 restores the initialized state. Image processing is continuously performed in the manner described above.

The present invention is not limited to the particular embodiment described above. Various changes and modifications may be made without departing from the spirit and scope of the invention.

Figure 5:
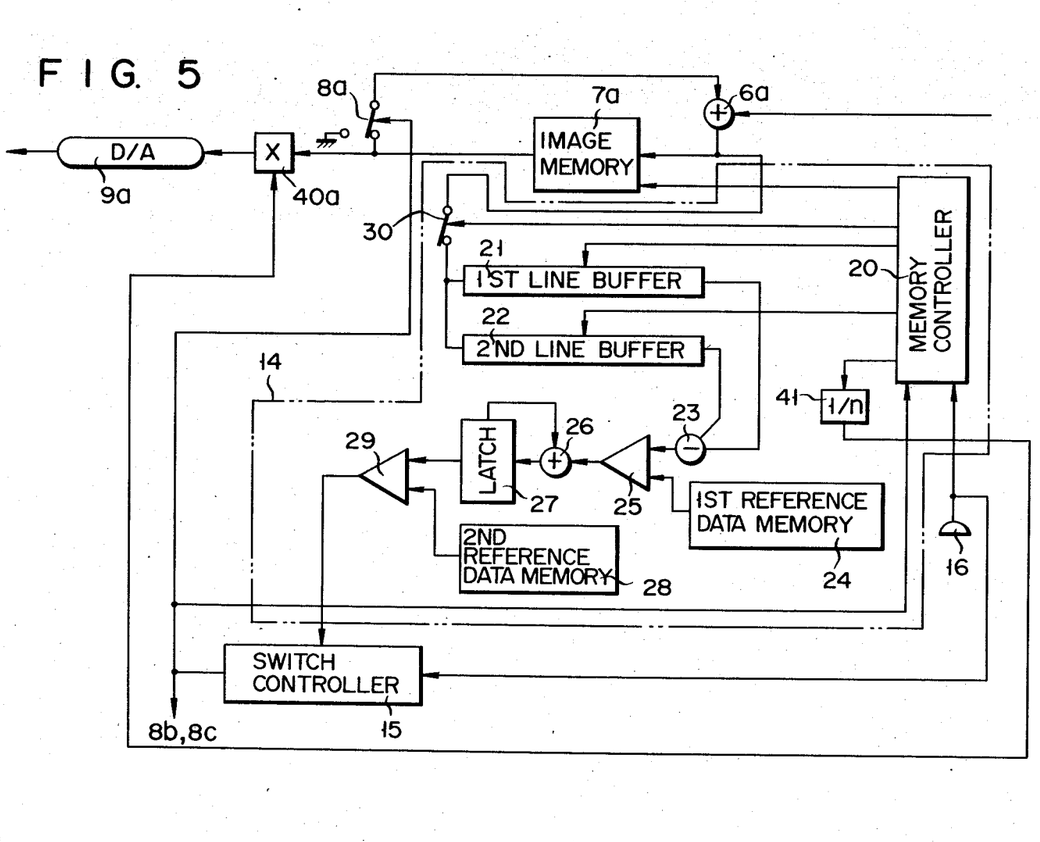
FIG. 5 is a block diagram showing the main part of a second embodiment of the present invention.

For example, as shown in FIG. 5, adding controller 14 may be arranged to receive only the output from adder 6a and discriminate the output from one of the three color systems. Switch controller 15 may be operated according to this discrimination operation. With this arrangement, the control signal is simultaneously supplied to switches 8a to 8c, thereby simultaneously stopping additions of the three color systems.

Figure 6:
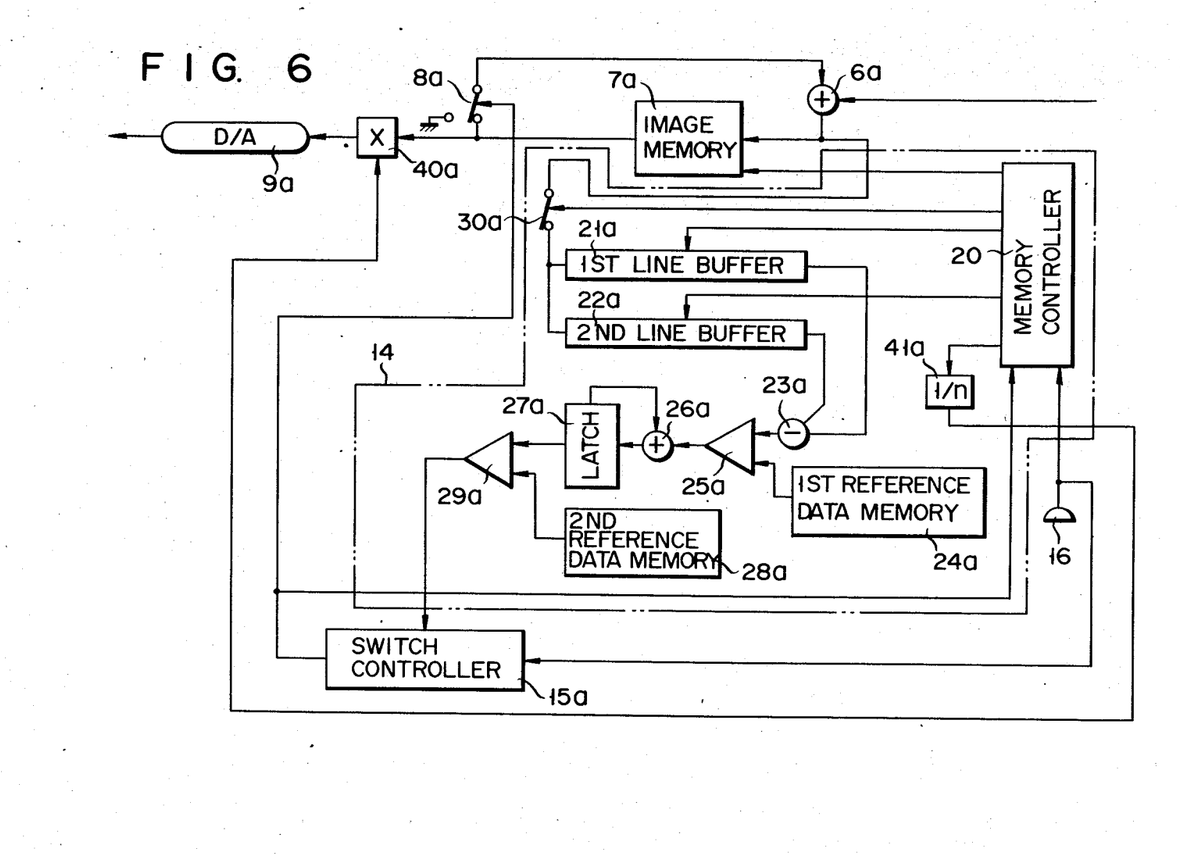
FIG. 6 is a block diagram showing the main part of a third embodiment of the present invention.

In addition, as shown in FIG. 6, adding controllers 14 may be respectively provided for three color signal systems, and "addition stop" control may be performed by different threshold values given for the respective colors. In this case, the spectral sensitivity of the photographing system can be corrected according to differences between the threshold values for the respective color components.

The embodiment described above will be described in more detail.

Figure 7:
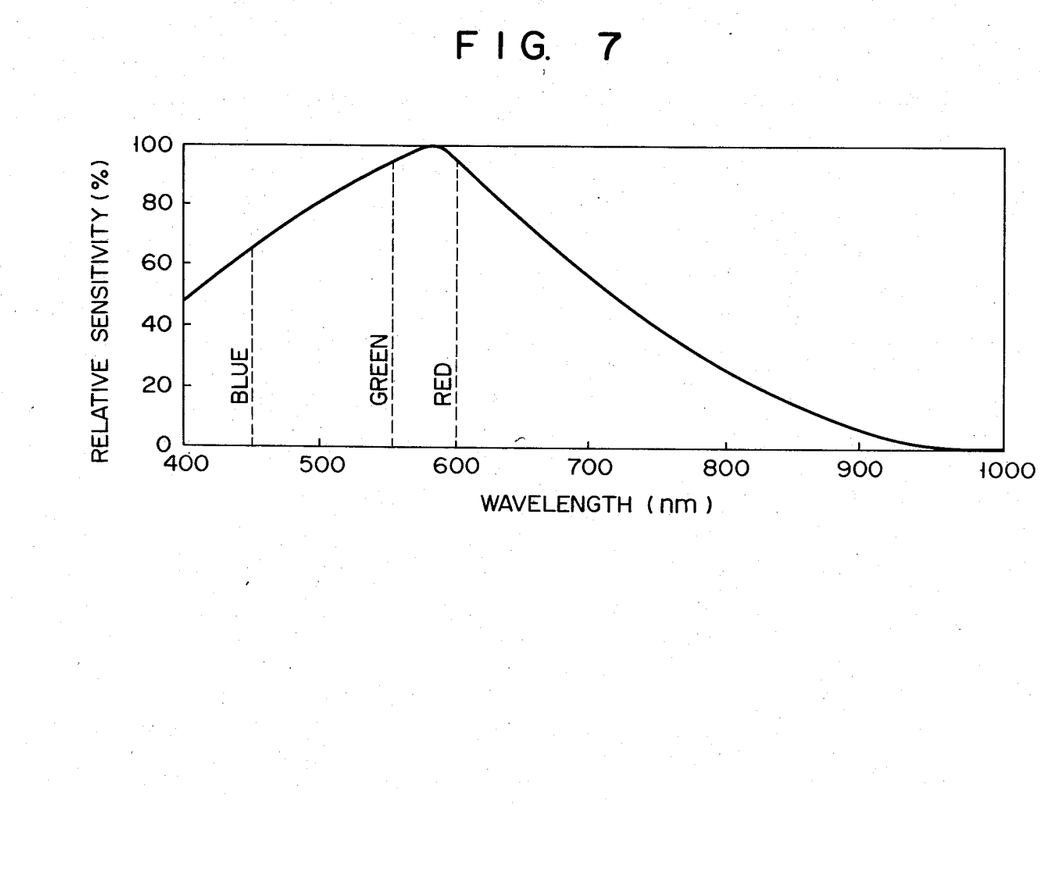
FIG. 7 is a graph showing the spectral sensitivity of the solid-state image-pickup device.

An image sensor generally has different sensitivity levels at different wavelengths of incident light. As shown in FIG. 7, the solid-state image sensor used in the present invention has a substantially identical sensitivity level for the green and red components but a lower sensitivity level for the blue component by about 20% than that for the green or red component. In order to correct the different sensitivity levels, the number of additions for the blue component is set to be higher than that for the green or red component, thereby matching the sensitivity level of the blue component with that of the green or red component.

More specifically, corrected sensitivity levels Sg and Sb of the green (or red) and blue components are given as follows:

$$Sg = kng$$

$$Sb = 0.8\, knb$$

where k is the detection level of the green or red component for one frame, and ng and nb are the numbers of additions of the green (or red) and blue components (i.e, the numbers of added frames), respectively. In order to satisfy relation $Sg = Sb$, $$kng = 0.8\, knb$$

therefore, $$nb/ng = 1/0.8 = 1.25$$

After the addition of the green or red component is stopped by the switch controller, the addition of the blue component continues. When the addition of the blue component is completed by 1.25 times that of the green or red component, the blue component addition is stopped.

The portion subjected to image data comparison in the adding controller is not limited to one line corresponding to the central portion of the displayed image, but can be extended to a plurality of lines, any one-line on the displayed image, a vertical one-line, or a portion corresponding to a predetermined area of the displayed image.

The image memory may comprise a pair of image memories which are then alternately used to improve data read and write efficiency.

The photographing system comprises R (red), G (green), and B (blue) filters which are separately operated. However, the three-color filter may be arranged in a mosaic manner corresponding to the pixels of the image pickup device. Alternatively, yellow and red filters may be used to perform color display.

The position error detection scheme is not limited to a scheme for calculating an absolute value of the difference between the image data, but can also be extended to a scheme using one of positive and negative differences.

What is claimed is:

1. An endoscope apparatus for producing a video signal obtained by inserting an insertion section in a body cavity of a patient and photographing a portion to be examined, and for providing image information corresponding to the video signal, so as to achieve medical diagnosis, comprising:

adding memory means for sequentially adding and superposing succeeding image information signals constituting the video signal and for storing a superposed signal;

detecting means for sequentially comparing the succeeding image information signals constituting the video signal and detecting a position error between the image information signals in at least identical portions of image areas;

control means for causing said adding memory means to start sequential additions, in response to an external freeze instruction and for causing said adding memory means to inhibit the sequential additions, in response to a detection signal from said position error detecting means; and display means for displaying the image information signals stored in said adding memory means.

2. An apparatus according to claim 1, wherein said position error detecting means comprises difference processing means for calculating difference data between the image information signals of a predetermined image area, and position error discriminating means for discriminating a position error according to the difference data.

3. An apparatus according to claim 2, wherein said position error discriminating means includes means for comparing a value of the difference data with a predetermined reference value, to discriminate the position error.

4. An apparatus according to claim 2, wherein said position error discriminating means includes means for comparing a value of the difference data with a predetermined first reference value, and means for accumulating comparison results from said first reference value comparing means and for comparing an accumulated value with a predetermined second reference value.

5. An apparatus according to claim 1, wherein said adding memory means comprises memory means for storing at least a one-image information signal, and adding means for adding the stored one-image information signal and a next image information signal in units of pixels and for updating the one-image information signal stored in said memory means by storing a sum calculated by said adding means.

6. An apparatus according to claim 5, wherein said adding memory means further comprises means for averaging the accumulated image information signals.

7. An apparatus according to claim 1, further comprising a still camera for photographing a frozen image displayed on said display means, and camera control means for controlling a photographing operation of said still camera, in response to said control means.

8. An endoscope apparatus for producing a video signal of a plurality of color components obtained by inserting an insertion section in a body cavity of a patient and photographing a portion to be examined, and for providing image information corresponding to the video signal, so as to achieve medical diagnosis, comprising:

adding memory means for sequentially adding and superposing succeeding image information signals constituting the video signal, in units of color components and storing a superposed signal;

detecting means for sequentially comparing the succeeding image information signals constituting the video signal, for at least a predetermined one of the color components of the image information signals of the color components, and for detecting a position error between the image information signals in at least identical portions of image areas;

control means for causing said adding memory means to start sequential additions in response to an external freeze instruction, and for causing said adding memory means to inhibit the sequential additions in response to a detection signal from said position error detecting means; and display means for displaying the image information signals stored in said adding memory means.

9. An apparatus according to claim 8, wherein said position error detecting means comprises difference processing means for calculating difference data between the image information signals of a predetermined image area and position error discriminating means for discriminating a position error according to the difference data.

10. An apparatus according to claim 9, wherein said position error discriminating means includes means for comparing a value of the difference data with a predetermined reference value, to discriminate the position error.

11. An apparatus according to claim 9, wherein said position error discriminating means includes means for comparing a value of the difference data with a predetermined first reference value, and means for accumulating comparison results from said first reference value comparing means and for comparing an accumulated value with a predetermined second reference value.

12. An apparatus according to claim 8, wherein said adding memory means comprises memory means for storing at least a one-image information signal, and adding means for adding the stored one-image information signal and a next image information signal in units of pixels and for updating the one-image information signal stored in said memory means by storing a sum calculated by said adding means.

13. An apparatus according to claim 12, wherein said adding memory means further comprises means for averaging the accumulated image information signals.

14. An apparatus according to claim 8, further comprising a still camera for photographing a frozen image displayed on said display means, and camera control means for controlling a photographing operation of said still camera, in response to said control means.

15. An apparatus according to claim 8, wherein said position error discriminating means comprises means having different discrimination reference values in units of color components, and said control means comprises means for correcting spectral sensitivity of the video signal by giving an addition stop instruction in response to said discriminating means, in units of color components.

* * * * *